United States Patent [19]

Chen

[11] Patent Number: 5,421,220
[45] Date of Patent: Jun. 6, 1995

[54] AUXILIARY HANDLEBAR OF BICYCLE

[76] Inventor: Chau-Fwu Chen, No. 9, Alley 62, Lane 168, Feng Tung Road, Feng Yuan City, Taichung County, Taiwan, Prov. of China

[21] Appl. No.: 164,916

[22] Filed: Dec. 9, 1993

[30] Foreign Application Priority Data

Jul. 24, 1993 [CN] China ................. 93220410.4

[51] Int. Cl.⁶ ........................................ B62K 21/12
[52] U.S. Cl. ................................ 74/551.8; 74/551.1; 403/33
[58] Field of Search ................ 74/551.1–551.8; 280/279; 403/375, 93, 98

[56] References Cited

U.S. PATENT DOCUMENTS

| | | | |
|---|---|---|---|
| 1,595,557 | 8/1926 | Mamiya | 74/551.4 |
| 3,481,218 | 12/1969 | Yoshikawa | 74/551.4 X |
| 4,361,057 | 11/1982 | Kochera | 403/98 X |
| 4,621,805 | 11/1986 | Chen | 403/93 X |
| 5,033,325 | 7/1991 | Giard | 74/551.3 |
| 5,154,095 | 10/1992 | Giard | 74/551.1 |
| 5,197,350 | 3/1993 | Borromeo | 74/551.1 |
| 5,235,871 | 8/1993 | Yamazaki et al. | 74/551.8 |
| 5,247,852 | 9/1993 | Guerr | 74/551.8 |
| 5,285,698 | 2/1994 | Liao | 74/551.3 X |

FOREIGN PATENT DOCUMENTS

| | | | |
|---|---|---|---|
| 2671323 | 7/1992 | France | 74/551.8 |
| 365000 | 11/1938 | Italy | 74/551.3 |
| 395697 | 7/1933 | United Kingdom | 74/551.3 |

*Primary Examiner*—Vinh T. Luong

[57] ABSTRACT

An auxiliary handlebar of bicycle comprises a main body provided centrally with a spherical connection portion having a connection slot dimensioned to fit securely over one end of the handlebar of a bicycle. The connection portion extends in one direction to form a curved rod having a tapered joint of hollow construction. The connection portion further extends in a direction opposite to the curved rod to form a straight rod. The spherical connection portion provided with a split groove extending to reach the bottom of the connection slot. Located respectively by both upper and lower sides of the split groove are a through hole and a threaded hole engageable with a bolt which can be so tightened as to fasten securely the main body of the auxiliary handlebar with the handlebar of the bicycle. A rotatable rod of the auxiliary handlebar is adjustably fastened to the tapered joint of the main body.

3 Claims, 4 Drawing Sheets

AUXILIARY HANDLEBAR OF BICYCLE

BACKGROUND OF THE INVENTION

1. Field of the Invention

The present invention relates to an improved auxiliary handlebar of bicycle.

2. Description of the Prior Art

As shown in FIG. 4, a prior art auxiliary handlebar of bicycle comprises a main body 40 which is provided with an upper through hole 41, a lower through hole 42, and a connecting rib 43 located between the upper and the lower through holes 41 and 42. The lower through hole 42 is circular in shape and inclined. The connecting rib 43 is provided centrally with a slot 44 through which the upper and the lower through holes 41 and 42 are in communication with each other. The slot 44 divides the portion between the upper and the lower through holes 41 and 42 into two portions, with one of the two portions being slotted and with another one of the two portions being provided with a threaded hole (not shown in the drawing) engageable with a bolt 45 by means of which the main body 40 is fastened securely with a handlebar 46. As the bolt 45 is tightened up, the slot 44 is forced to become narrower.

The prior art auxiliary handlebar of bicycle described above is defective in design in that it is of a thin and flat construction and is therefore structurally weak, and that it is fastened to the upper portion of the handlebar 46, thereby limiting the gripping pattern of the handlebar 46. Accordingly, the way that the bicycle can be operated is restricted.

SUMMARY OF THE INVENTION

It is therefore the primary objective of the present invention to provide an improved auxiliary handlebar of bicycle, which comprises curved main body extending downward for an appropriate length and which can be mounted on the bicycle handlebar in such a manner that it facilitates the easy handling of the bicycle.

It is another objective of the present invention to provide an improved auxiliary handlebar of bicycle, which can be adjustably mounted on the bicycle handlebar for easy and comfortable gripping.

The foregoing objectives of the present invention are attained by an improved auxiliary handlebar of bicycle, which comprises a main body provided centrally with a spherical connection portion having a connection slot dimensioned to fit securely over one end of the handlebar of a bicycle. The connection portion extends for a predetermined length in one direction to form a curved rod having a tapered joint of hollow construction. The connection portion further extends for a predetermined length in a direction opposite to the curved rod so as to form a straight rod. The spherical connection portion is provided in the wall thereof with a split groove extending from the connection slot to reach the bottom of the connection slot. Located respectively by both upper and lower sides of the split groove are a through hole and a threaded hole engageable with a bolt which can be so tightened as to fasten securely the main body of the auxiliary handlebar with the handlebar of a bicycle. A rotatable rod of the auxiliary handlebar is rotatably attached to the tapered joint of the main body.

The foregoing objectives, features and functions of the present invention can be more fully understood by studying the following detailed description of the present invention in conjunction with the accompanying drawings.

BRIEF DESCRIPTION OF THE DROWNINGS

DETAILED DESCRIPTION OF THE PREFERRED EMBODIMENT

Figure 1:
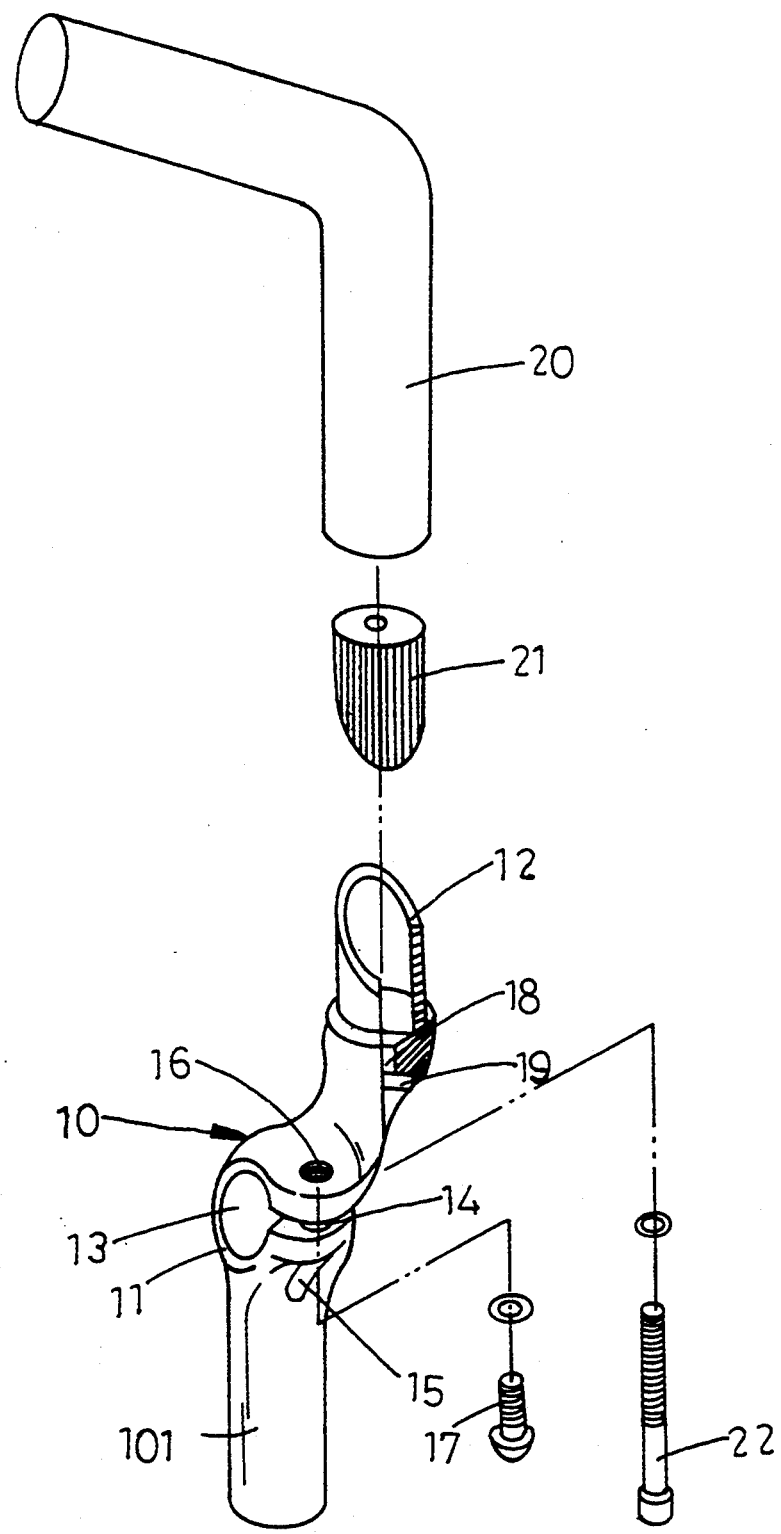
FIG. 1 shows an exploded view of the present invention.
Figure 2:
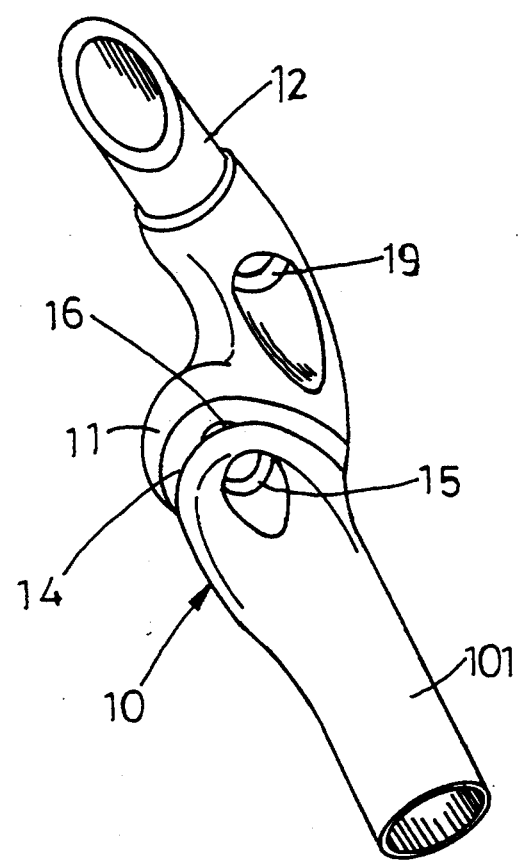
FIG. 2 shows a perspective view of the present invention.

As shown in FIGS. 1 and 2, an auxiliary handlebar embodied in the present invention comprises a main body 10 which is provided centrally with a substantially spherical connection portion 11 having a connection slot 13 dimensioned to fit securely over one end of the handlebar 30 of a bicycle. The connection portion 11 extends for a predetermined length in one direction to form a curved rod having a tapered joint 12 of hollow construction. The connection portion 11 further extends for a predetermined length in a direction opposite to the curved rod so as to form a straight rod 101. The connection portion 11 is provided in the wall thereof with a split groove 14 extending through the length of the connection slot 13 and communicating with the connection slot 13. Located respectively by both upper and lower sides of the split groove 14 are a through hole 15 and a threaded hole 16 engageable with a bolt 17, which can be so tightened as to fasten securely the main body 10 with the handlebar 30 of the bicycle.

Figure 3:
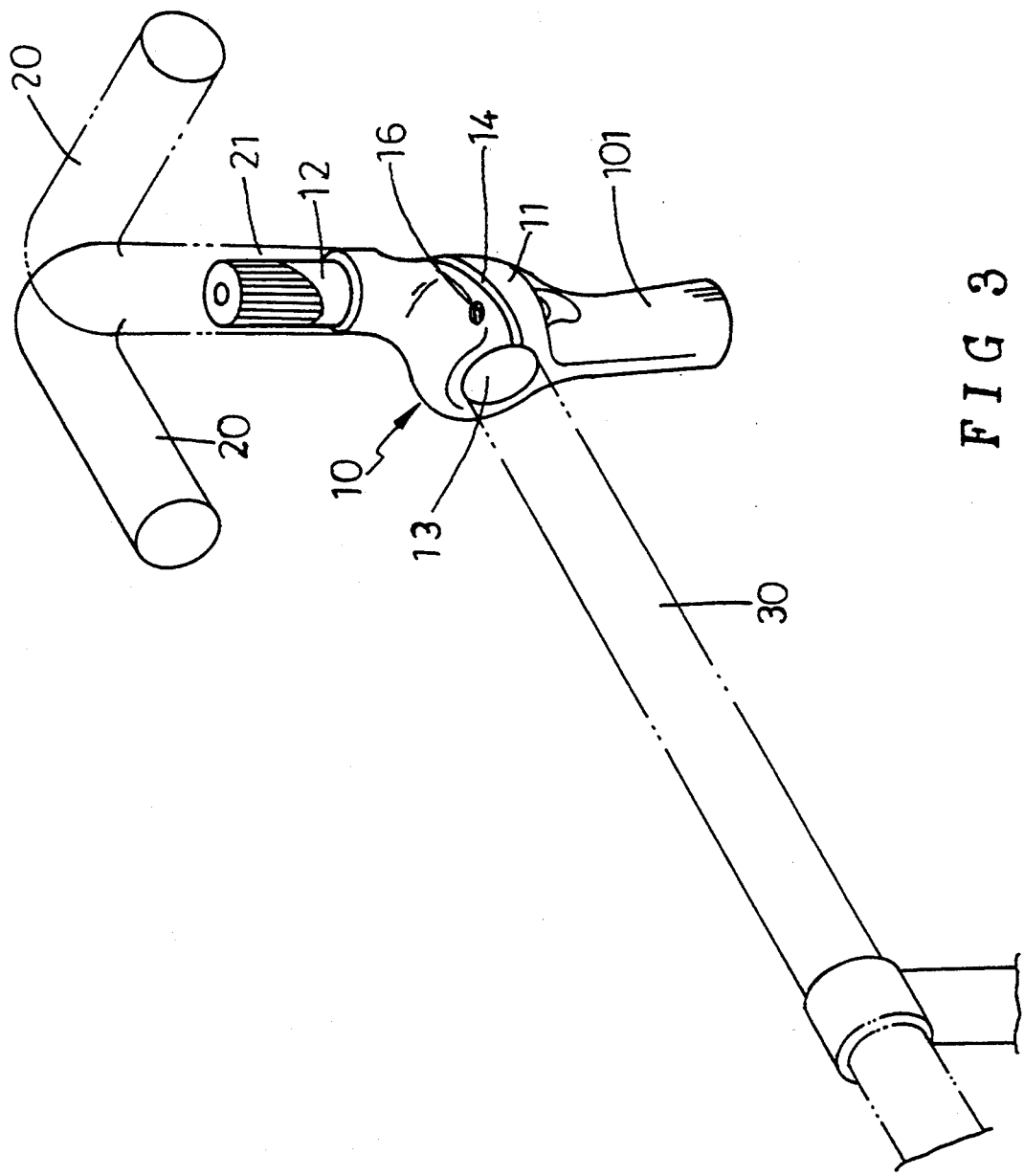
FIG. 3 is a schematic view illustrating the adjustment of the rotatable rod of the auxiliary handlebar of the present invention.
Figure 4:
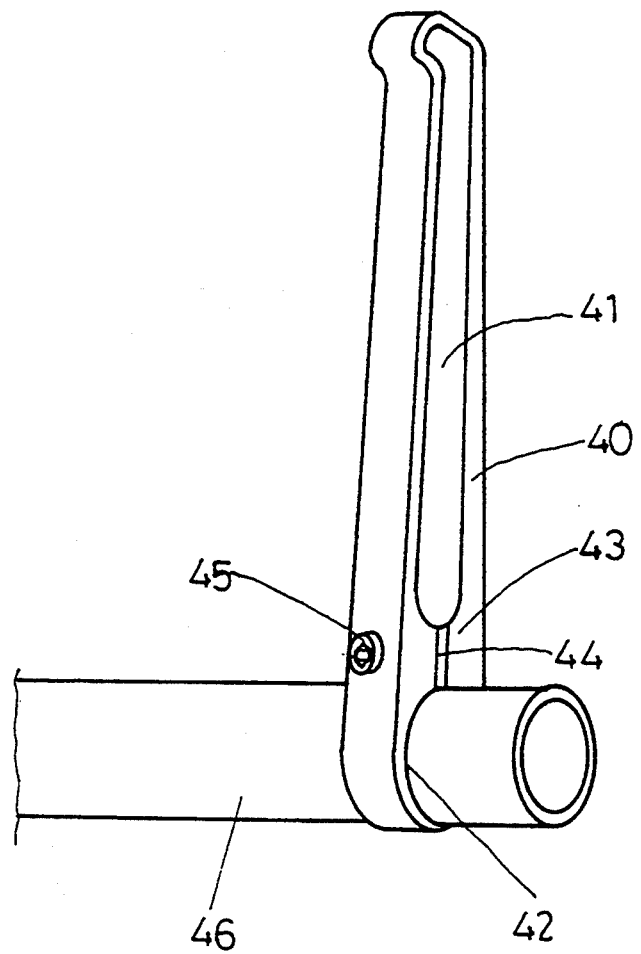
FIG. 4 shows a perspective schematic view of the auxiliary handlebar of the prior art.

The tapered joint 12 of the main body 10 is provided at the bottom thereof with a through hole 18 and a cavity 19 in communication with the through hole 18. The tapered joint 12 is so dimensioned as to receive therein securely a washer 21 for the purpose of fastening rotatably thereto a rotatable rod 20. The washer 21 is fastened by means of a bolt 22. The rotatable rod 20 can be adjusted as desired by a bicyclist, as shown in FIG. 3.

The main body 10 of the auxiliary handlebar of the present invention is provided at the midsection thereof with the connection slot 13 to which the handlebar 30 of a bicycle is fastened, thereby making the hand gripping areas available to a bicyclist on both sides of the handlebar 30 so as to enhance the maneuverability of the bicycle. In addition, such maneuverability is reinforced by the fact that the connection portion 11 is provided with an arcuate surface to facilitate the bicyclist to adjust freely the gripping posture, and that the rotatable rod 20 of the auxiliary handlebar is adjustably fastened to the main body 10. By comparison, the main body 40 of the auxiliary handlebar of the prior art provides a bicyclist with a relatively limited hand gripping area.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. An auxiliary handlebar of a handlebar of a bicycle comprising a rod and a main body; wherein said main body is provided at a midsection thereof with a connection portion and having a connection slot dimensioned to fit securely over one end of said handlebar, said main body is further provided with a curved portion having a tapered joint and extending in one direction for a predetermined length from said connection portion, said main body is further provided with a straight rod extending in a direction opposite to said one direction for a predetermined length, said connection portion having a split groove extending therein and communicating with said connection slot, said connection portion further having a through hole and a threaded hole engaged with a bolt so as to fasten securely said main body with said handlebar of said bicycle.

2. The auxiliary handlebar of claim 1, wherein said rod fastened to said tapered joint includes a washer disposed therein for engaging with said tapered joint and for securing said rod.

3. The auxiliary handlebar of claim 1, wherein said tapered joint is of hollow construction and tubular in shape.

* * * * *